United States Patent [19]

Kuno et al.

[11] Patent Number: 4,672,565

[45] Date of Patent: Jun. 9, 1987

[54] DIRECTION DETECTING SYSTEM FOR VEHICLES

[75] Inventors: Akira Kuno, Oobu; Muneaki Matsumoto, Okazaki; Koji Numata, Toyokawa, all of Japan

[73] Assignee: Nippon Soken, Inc., Nishio, Japan

[21] Appl. No.: 355,621

[22] Filed: Mar. 8, 1982

[30] Foreign Application Priority Data

| Mar. 10, 1981 | [JP] | Japan | 56-34199 |
| Aug. 4, 1981 | [JP] | Japan | 56-122249 |
| Aug. 5, 1981 | [JP] | Japan | 56-123371 |

[51] Int. Cl.⁴ .................. G01C 17/38; G06F 15/50
[52] U.S. Cl. ............................. 364/571; 364/457; 33/356; 33/357
[58] Field of Search ............ 364/571, 443, 424, 453, 364/457, 449; 33/356, 357, 355

[56] References Cited

U.S. PATENT DOCUMENTS

| 3,943,763 | 3/1976 | Garner | 33/356 |
| 4,024,382 | 5/1977 | Fowler | 33/356 |
| 4,031,630 | 6/1977 | Fowler | 364/571 X |
| 4,032,758 | 6/1977 | Lewis | 364/457 |
| 4,091,543 | 5/1978 | Lapeyre | 364/571 X |
| 4,124,897 | 11/1978 | Martin | 364/571 |
| 4,192,074 | 3/1980 | Chang | 33/228 |
| 4,262,427 | 4/1981 | Lynch et al. | 33/361 |
| 4,327,498 | 5/1982 | Setter et al. | 364/571 X |
| 4,336,596 | 6/1982 | Martin | 364/571 X |
| 4,414,753 | 11/1983 | Moulin et al. | 33/357 |
| 4,416,067 | 11/1983 | Scherer et al. | 33/356 |

Primary Examiner—Gary Chin
Attorney, Agent, or Firm—Cushman, Darby & Cushman

[57] ABSTRACT

A direction detecting system comprises a geomagnetic field sensor for detecting the direction of the earth magnetism by two perpendicular components and a computing circuit for computing a direction and producing a direction signal from the electrical signals associated with the two perpendicular components from the geomagnetic field sensor. The computing circuit detects maximum values of distortions according to the distortion characteristics of the electrical signals associated with the two perpendicular components from the geomagnetic field sensor. Distortion amounts are computed and stored by the maximum distortion values and are used to correct the electrical signals from the geomagnetic field sensor.

11 Claims, 17 Drawing Figures

4,672,565

DIRECTION DETECTING SYSTEM FOR VEHICLES

BACKGROUND OF THE INVENTION

The present invention relates to a direction detecting system for generating a direction signal corresponding to the direction of movement of a moving body such as a motor vehicle in response to a signal from a geomagnetic field sensor.

In conventional direction detecting systems, the distortion of the earth magnetism due to the residual magnetism of the vehicle or the like is corrected by a correcting magnet mounted on the outside of the vehicle.

This prior art construction requires consideration of various factors including the position, number and the intensity of the correcting magnet mounted on the vehicle for offsetting the distortion of the earth magnetism due to the residual magnetism of the vehicle or the like. Partly due to the complicated procedures of correction and partly due to the difference of the distortion characteristics of the earth magnetism for different vehicles, different corrections are required for different vehicles. Further, since the signal from the earth magnetism sensor itself is distorted in some cases, the accurate detection of the direction of the earth magnetism is impossible by the prior art systems.

SUMMARY OF THE INVENTION

The present invention has been developed in view of this problem. A first object of this invention is to provide a direction detecting system in which maximum distortions corresponding to the distortion characteristics of two perpendicular electrical signal components from the geomagnetic field sensor associated with one or more revolutions of the moving body are detected, and these maximum distortions are used to compute and store the amounts of distortion, which two amounts of distortion are used to correct the electrical signal from the geomagnetic field sensor, thus generating a direction signal associated with an exact direction of movement of the moving body.

A second object of the present invention is to provide a direction detecting system comprising a first sensor for detecting an abnormal condition due to the secular variation or the like of the distortion of the earth magnetism caused by the residual magnetism of the moving body, a second sensor for detecting the maximum values of distortion corresponding to the distortion characteristics of two perpendicular electrical signal components obtained from the geomagnetic field sensor associated with one or more revolutions of the moving body, a computer for computing and storing the amount of distortion from the respective maximum values of distortion, and a correction circuit for correcting the electrical signals from the geomagnetic field sensor in response to the amount of distortion, thereby generating a direction signal for an exact direction of movement of the moving body taking into consideration the effect of the secular variation of the distortion of the earth magnetism or the like.

A third object of the present invention is to provide a direction detecting system in which the amount of distortion of the geomagnetic field sensor and the effect that the distortion of the earth magnetism due to the residual magnetism of the moving body or the like caused by a revolution of the moving body has on the geomagnetic field sensor are detected in the form of the amount of distortion of the signal from the geomagnetic field sensor in response to a timing signal generated from a timing signal generator; a revolution of the moving body is identified from the signal of the geomagnetic field sensor thereby to automatically end the detection of the amount of distortion; and the signal from the geomagnetic field sensor is corrected by the amount of distortion computed and stored by the detecting operation, thus generating a direction signal associated with the correct direction of movement of the moving body.

DESCRIPTION OF THE PREFERRED EMBODIMENTS

Figure 1:
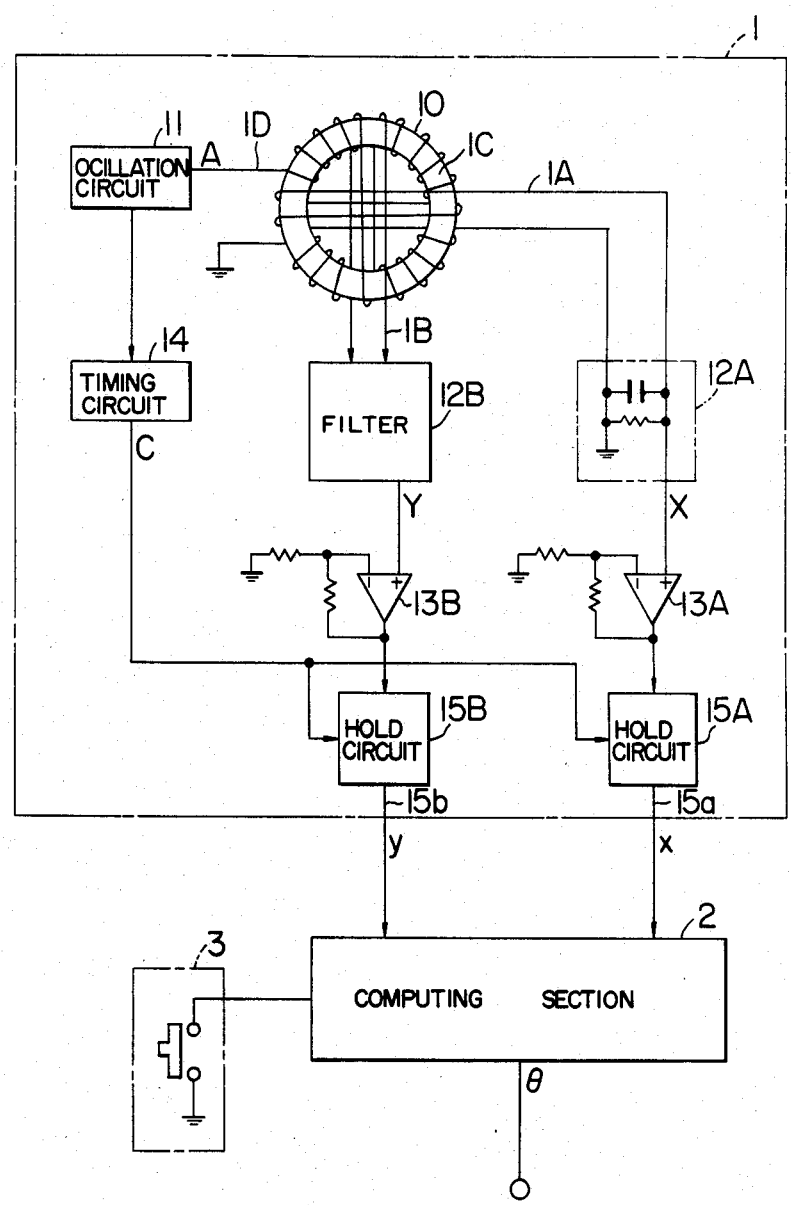
FIG. 1 is an electrical circuit diagram showing a first embodiment of the present invention.
Figure 2:
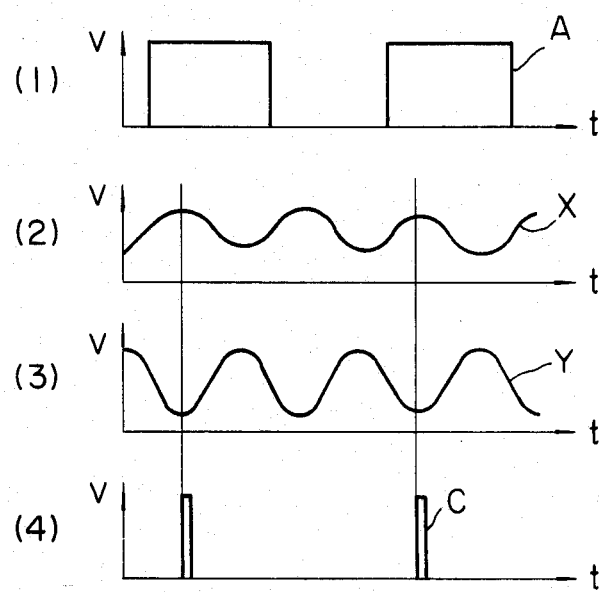
FIG. 2(1), 2(2), 2(3) and 2(4) show voltage waveforms for explaining the operation of a geomagnetic field sensor.

The present invention will be described below with reference to the embodiments shown in the accompanying drawings. An electrical circuit diagram of a first embodiment of the invention is shown in FIG. 1. A geomagnetic field sensor 10 includes a magnetic core 1C of ferromagnetic material, an exciting winding 1D wound on the magnetic core 1C and output windings 1A and 1B wound also on the magnetic core 1C at right angles to each other. Reference numeral 11 designates an oscillation circuit for generating a rectangular wave signal A (FIG. 2(1)) for exciting the exciting winding 1D at the frequency f. The magnetic field in the magnetic core 1C changes with the sum (H+h) of the horizontal component H of the earth magnetism applied to the geomagnetic field sensor 10 and the horizontal component h of the distortion of the earth magnetism. An output proportional to the magnetic field in the magnetic core 1C is produced at the output windings 1A and 1B respectively, so that outputs X and Y (FIGS. 2(2) and 2(3)) of the frequency component 2f are obtained through filters 12A and 12B of the same construction including a capacitor and a resistor. The outputs X and Y are amplified at amplifier circuits 13A and 13B, and sample-held at hold circuits 15A and 15B by a signal C (FIG. 2(4)) from a timing circuit 14, thus producing DC outputs x and y at points 15a and 15b respectively.

In the case where the horizontal component H of the earth magnetism is applied to the output winding 1B at an angle of $\theta$ and the horizontal component h of the distortion of the earth magnetism is applied to the output winding 1B at an angle of $\phi$, the outputs x and y are expressed by the equations below.

$$x = K_1(H\sin\theta + h\sin\phi) + K_2x$$

$$y = K_1(H\cos\theta + h\cos\phi) + K_2Y$$

where $K_1$ is the amplification factor of the geomagnetic field sensor 1, and $K_2x$ and $K_2y$ are distortions of the geomagnetic field sensor 1. In the case where the vehicle, namely, $\theta$ is rotated by 360 degrees, the vectorial locus of the outputs x and y (points 15a and 15b) of the geomagnetic field sensor 1 assumes a circle having the radius of $K_1H$ with the center displaced from origin by $K_1h\sin\phi + K_2x$ along the X axis and by $K_1h\cos\phi + K_2y$ along the Y axis as shown in FIG. 3.

Figure 3:
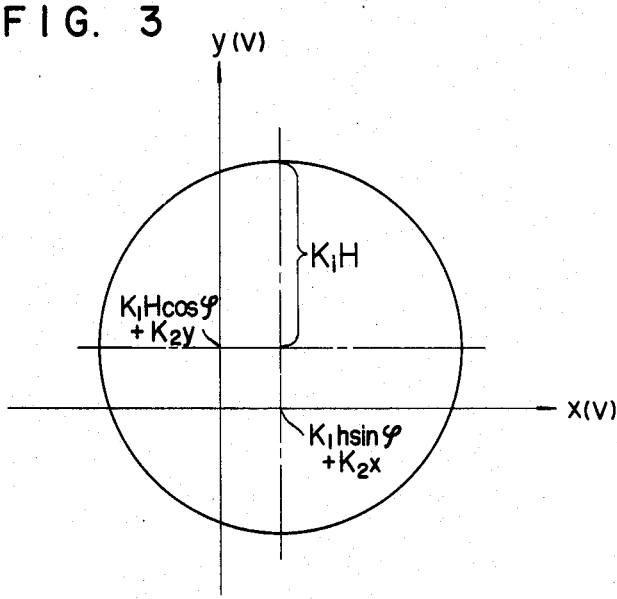
FIG. 3 is a diagram for explaining the operation of the geomagnetic field sensor.
Figure 4A:
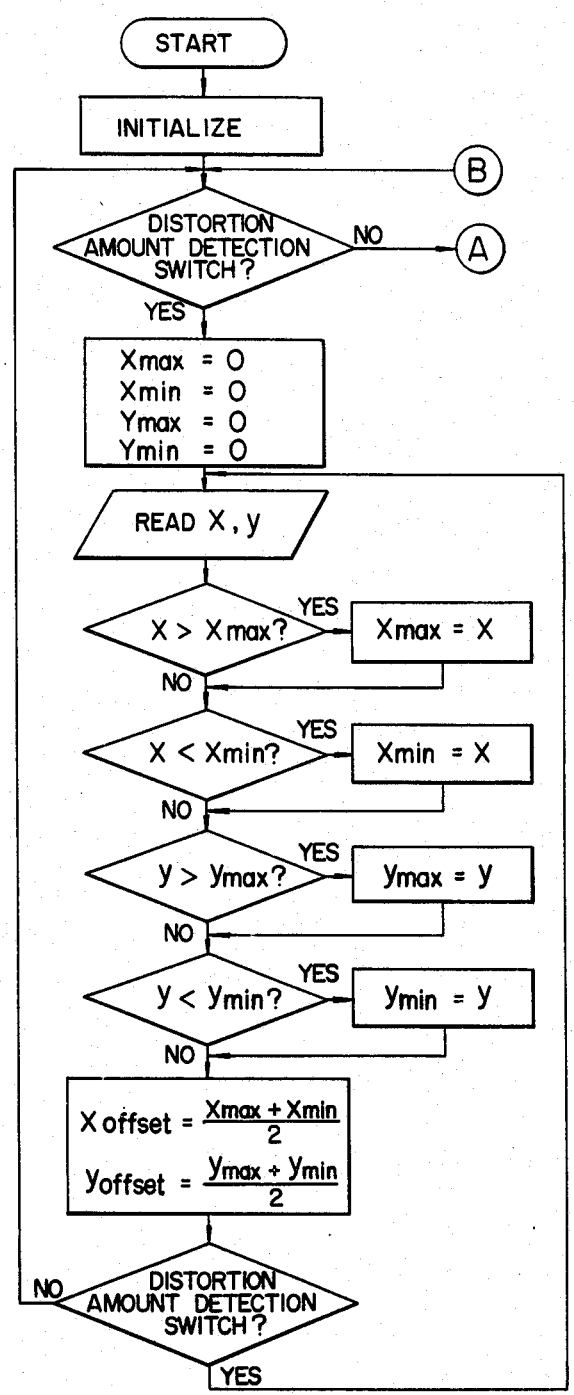
FIGS. 4A and 4B are flowcharts showing the computing processes of a computing section.
Figure 4B:
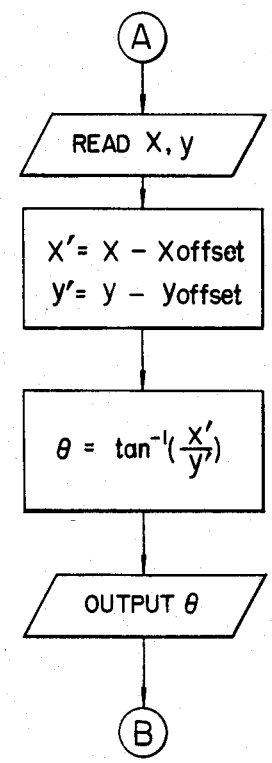

In FIG. 1, numeral 2 designates a computing section including a well-known microcomputer system for executing two types of computing operations shown in FIGS. 4A and 4B. In the computing operation shown in FIG. 4A, the outputs x and y of the geomagnetic field sensor 1 are continuously read during the holding on of the distortion detection switch 3, thereby to search for the maximum values Xmax and Ymax and the minimum values Xmin and Ymin (the values of maximum distortion according to the distortion characteristics). The sum of the maximum value and the minimum value is divided by two thereby to determine and store the center displacement from origin Xoffset and Yoffset. In other words, upon rotation of the vehicle by 360 degrees with the distortion amount detection switch 3 held on, the center displacement from origin ($K_1h\sin\phi + K_2x$) and ($K_1h\cos\phi + K_2y$) (hereinafter called the origin displacement) shown in FIG. 3 is obtained as the origin displacement Xoffset and Yoffset respectively.

In the computing process shown in FIG. 4B, on the other hand, when the distortion amount detection switch 3 is not yet turned on, the outputs x and y of the geomagnetic field sensor 1 are read and the origin displacements Xoffset and Yoffset are subtracted respectively thereby to determine x' and y'. From x' and y', the computation $\theta = \tan^{-1}(x'/y')$ is made thereby to produce the direction signal $\theta$ corresponding to the running direction of the vehicle.

Figure 6:
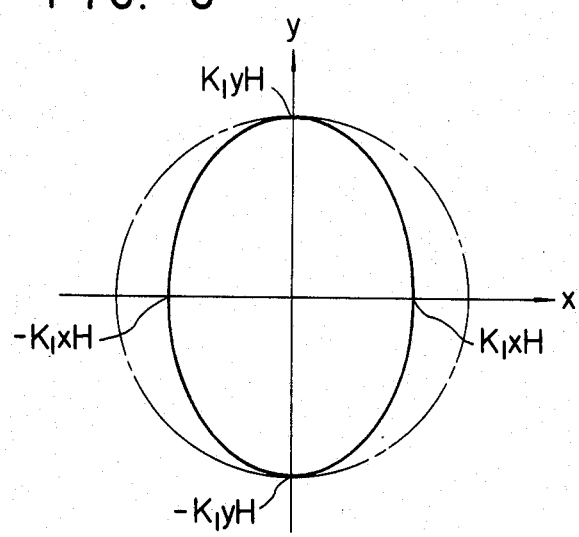
FIG. 6 is a diagram for explaining the operation of the geomagnetic field sensor according to another embodiment.
Figure 7A:
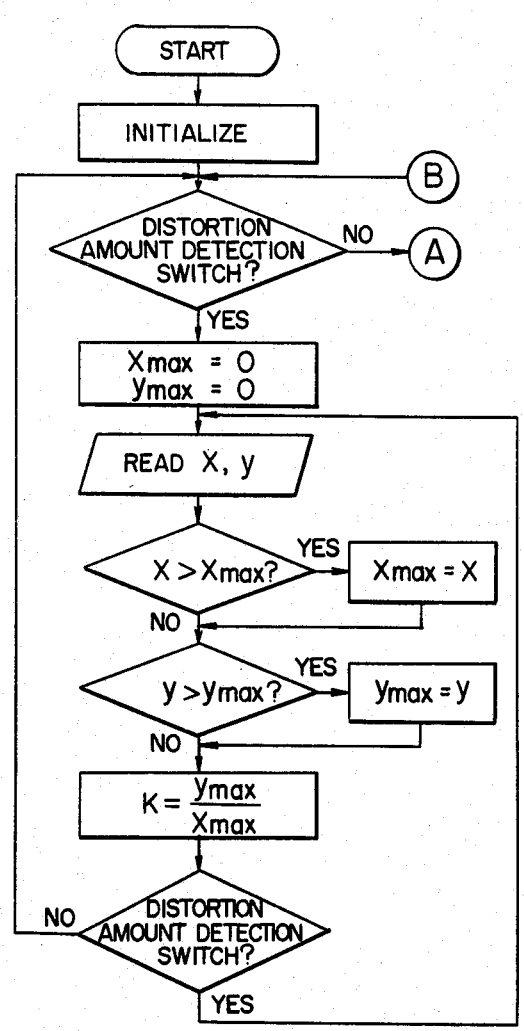
FIGS. 7A and 7B are flowcharts showing the computing processes of the computing section according to a second embodiment.
Figure 7B:
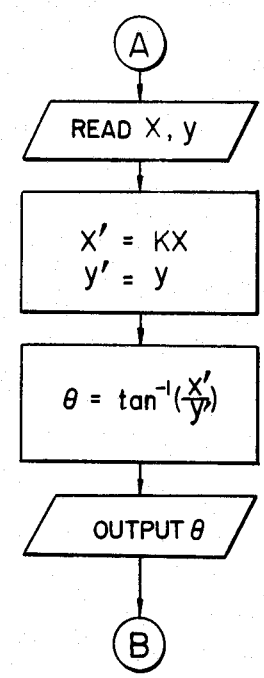

In the aforementioned embodiment, the output distortion of the geomagnetic field sensor 1 concerns the origin displacement as shown in FIG. 3. In the case of the distortion with different amplification factors for x and y as shown in FIG. 6, namely, in the case where the outputs x and y are expressed by $$x = K_1x \cdot H \cdot \sin\theta$$

$$y = K_1y \cdot H \cdot \cos\theta$$

the computation as shown in FIGS. 7A and 7B produces a direction signal exactly corresponding to the running direction of the vehicle. This computation may be combined with the computing operation of the first embodiment.

The geomagnetic field sensor 10 shown above is a ring core type flux gate sensor. As an alternative to this sensor, other type of flux gate sensor or Hall element may be used with equal effect.

Further, the direction signal $\theta$ may not be obtained by the computation of $\tan^{-1}(x'/y')$ but may be provided by the direction signal of 2N divisions from level comparison.

Furthermore, instead of the digital process with a microcomputer system, the computing section 2 may be realized by combining a comparator circuit and an adder-subtractor circuit analogically.

Moreover, the distortion amount detection switch 3 may be combined with a sensor for detecting one revolution of the vehicle so that the distortion amount detection switch 3 is turned off automatically after one revolution of the vehicle.

What is more, the direction detecting system according to the present invention may be applied to ships, airplanes and the like in addition to vehicles.

Figure 5:
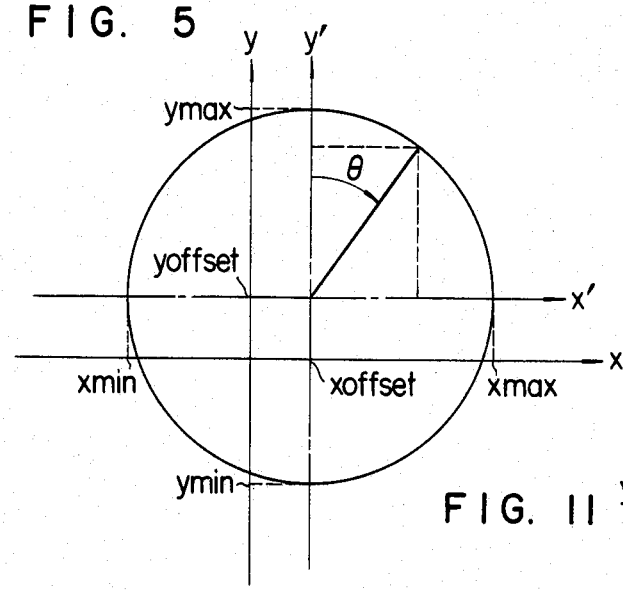
FIG. 5 is a diagram for explaining the computing processes of the computing section.
Figure 8:
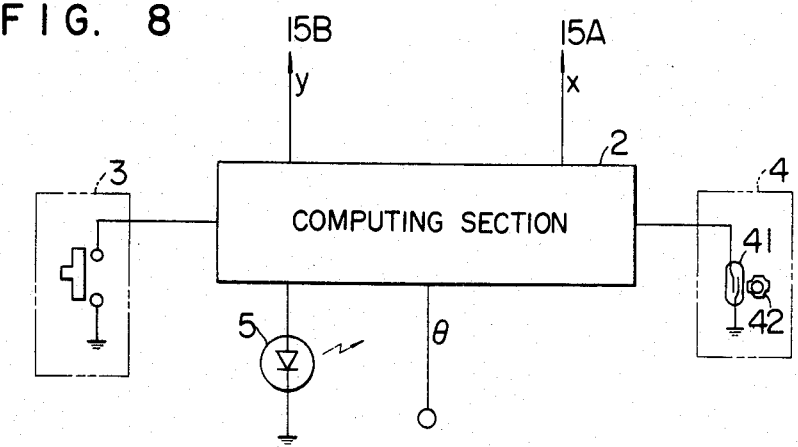
FIG. 8 is a partial electrical circuit diagram according to the second embodiment of the present invention.
Figure 9A:
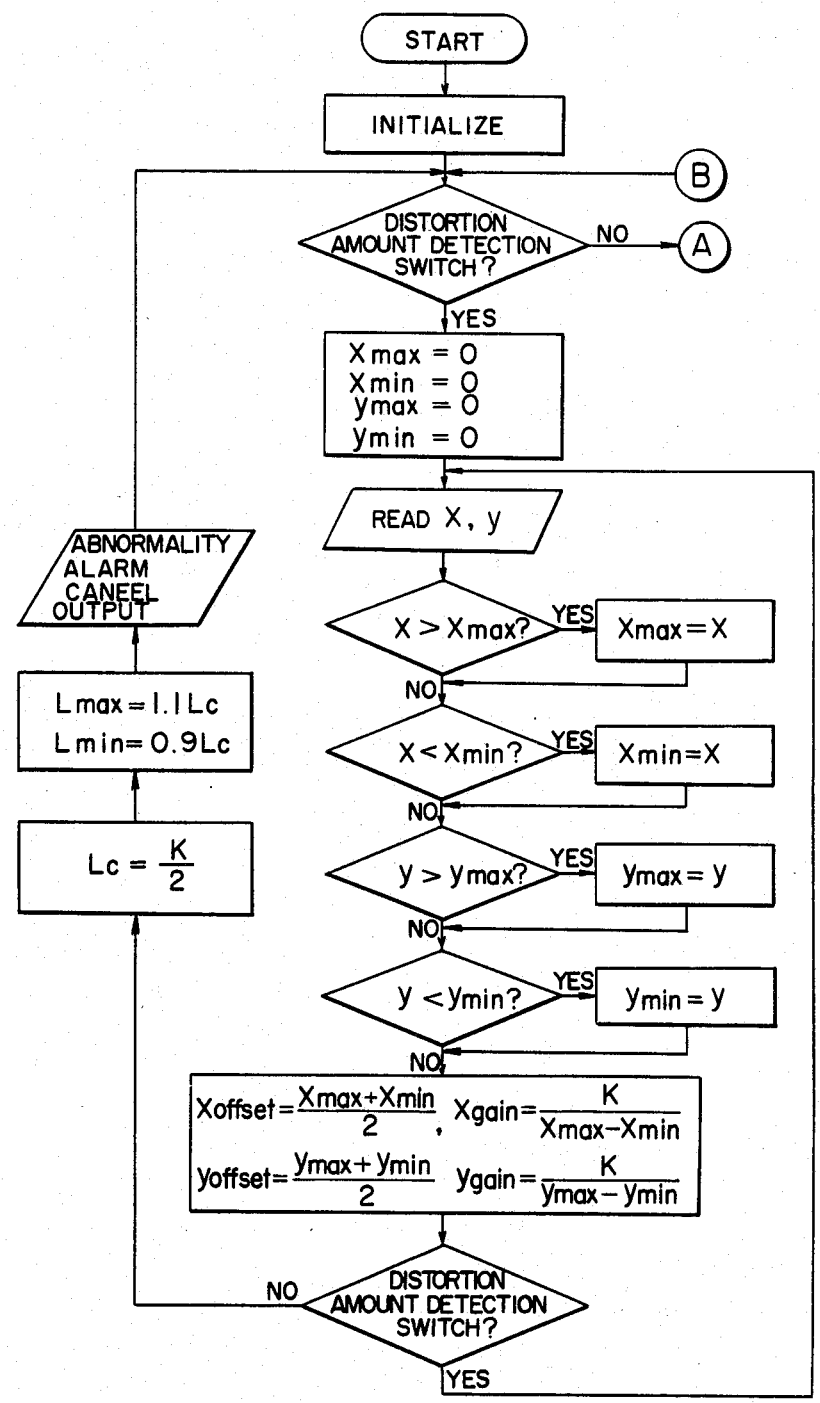
FIGS. 9A and 9B are flowcharts showing the computing processes of the computing section according to the second embodiment of the invention.

A partial electrical circuit diagram of a second embodiment of the present invention is shown in FIG. 8. As in FIG. 1, the computing section 2 includes a well-known microcomputer system for effecting two types of computing processes shown in FIGS. 9A and 9B. First, the computing process shown in FIG. 9A is such that while the distortion amount detection switch 3 is turned on and held, the outputs x and y of the geomagnetic field sensor 1 are continuously read thereby to search for the maximum values Xmax and Ymax and the minimum values Xmin and Ymin (maximum distortion values) (See FIG. 5). The sum of the maximum value and the minimum value is divided by two to determine and store the origin displacement Xoffset, Yoffset. By dividing the constant K by the difference between the maximum value and the minimum value, on the other hand, x gain and y gain are determined. Also, the fact that the radius Lc of the vectorial locus of the correction outputs x' and y' (as described in detail later) of the geomagnetic field sensor 1 after correction of the distortion is K/2x is used to determine the decision level Lmax, Lmin for deciding on abnormal conditions (an abnormal condition is considered to be involved when the radius K/2 has changed ±10% or more in this embodiment).

Figure 9B:
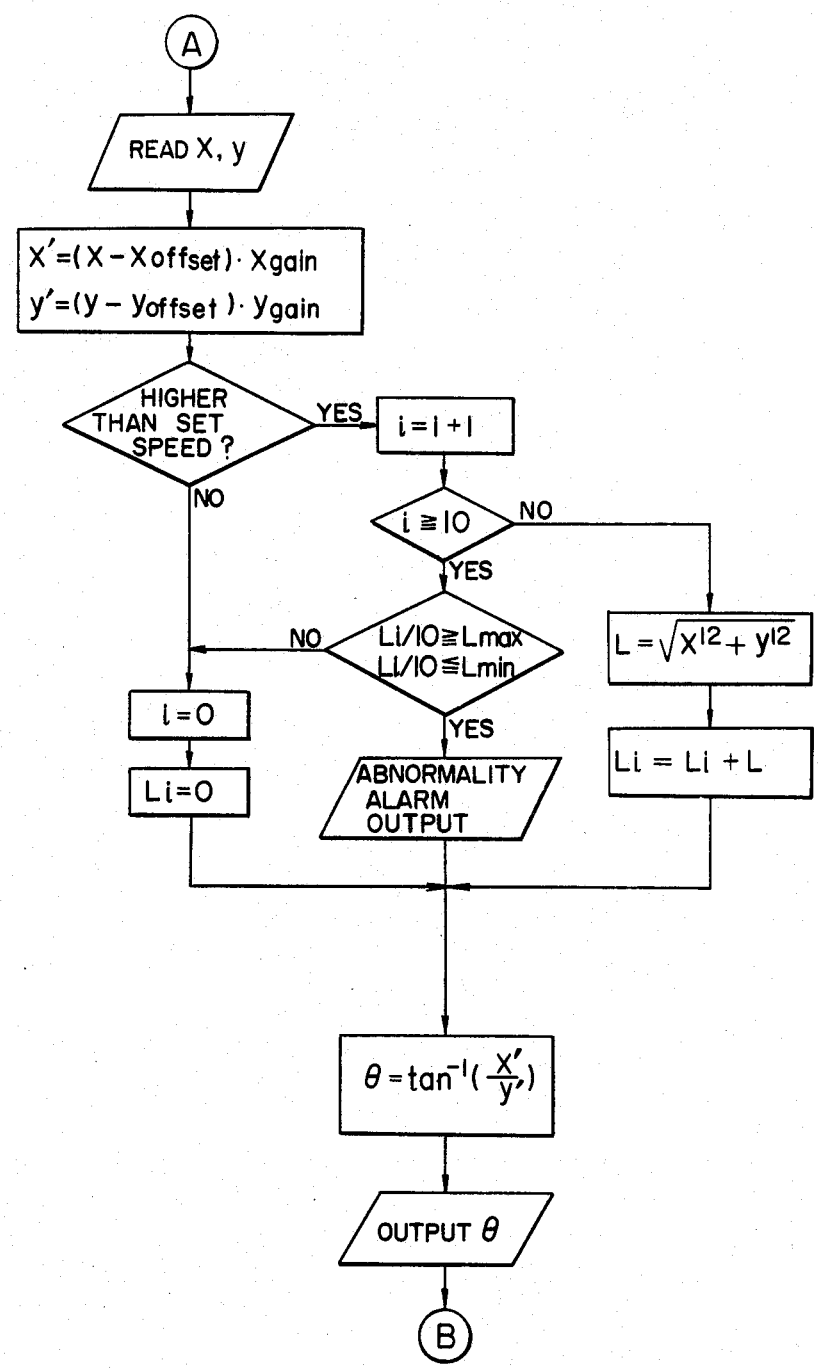

In the computing process shown in FIG. 9B, on the other hand, when the distortion amount detection switch 3 is not turned on, the outputs x and y of the geomagnetic field sensor 1 are read, and the origin displacement Xoffset and Yoffset are subtracted, while the Xgain and Ygain multiplied respectively thereby to determine the values x' and y'. The vehicle speed signal obtained from a vehicle speed sensor 4 shown in FIG. 8 including a rotor 42 of a magnetic operatively interlocked with the rotation of the drive shaft or a wheel of the vehicle and a reed switch 41 operated according to N and S poles of the rotor 42 is compared with a set speed, and when the vehicle speed is higher than the set speed, the value Li is obtained from the correction outputs x' and y'. The value Li is determined 10 times in this way, and an average value thereof is obtained. This average value is compared with the abnormal condition decision levels Lmax and Lmin. When Li/10 is higher than Lmax or lower than Lmin, it is decided that the correction outputs x' and y' are abnormal so that the abnormality alarm LED 5 (See FIG. 8) is lit thereby to inform the driver of the abnormality.

The calculation $\theta=\tan^{-1}(x'/y')$ is made from the correction outputs x' and y', and the direction signal $\theta$ corresponding to the running direction of the vehicle is produced.

The direction detecting system including the computing section 2 is so constructed that it is actuated by a power supply turned on by a power switch exclusive to the system (which may alternatively be a power supply adapted to be turned on by the ignition key switch of the vehicle), and the distortion amount is stored (in non-volatile way) regardless of the on or off state of the power switch.

In the second embodiment mentioned above, a constant K is fixed for the computing process shown in FIG. 9A. Instead, the value K may be obtained from the equation below to permit application to locations of different magnitudes of earth magnetism.

$$K = \sqrt{\left(\frac{xmax - xmin}{2}\right)^2 + \left(\frac{ymax - ymin}{2}\right)^2}$$

Although in the aforementioned embodiment, the value Li is obtained ten times and the average thereof is used for abnormality decision, it is obvious that the system is adversely affected by external factors to a lesser degree if an abnormality decision is made from an average of an increased number (such as 50 to 100) of data. It is also apparent that any means capable of deciding on an abnormality such as buzzer may be employed as the method of announcing the abnormality.

Figure 11:
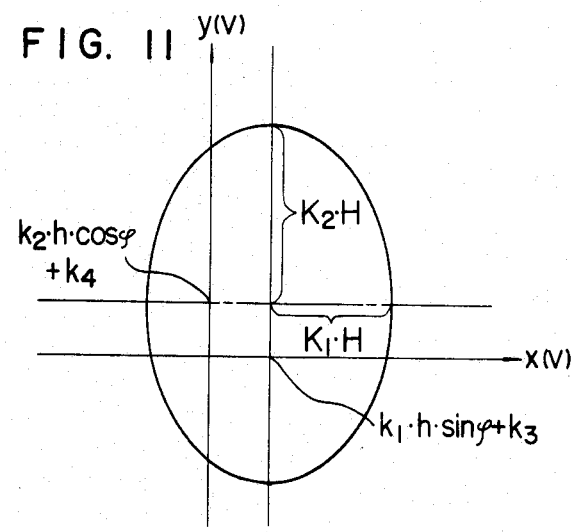
FIG. 11 is a diagram for explaining the operation of the geomagnetic field sensor.
Figure 10:
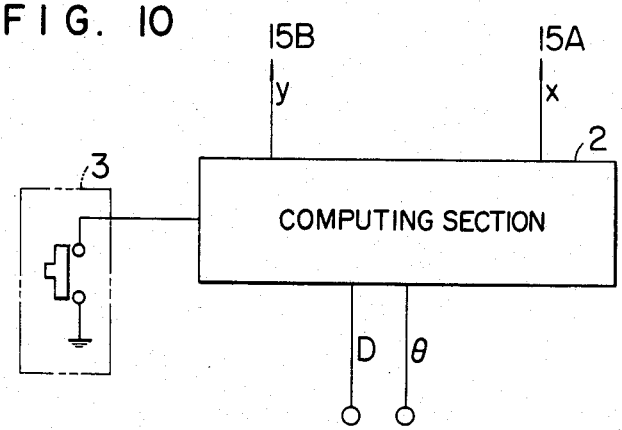
FIG. 10 is a partial electrical circuit diagram according to a third embodiment of the present invention.

A part of the electrical circuit according to a third embodiment of the present invention is shown in FIG. 10. The other parts are constructed in the same manner as the embodiment of FIG. 1. Assume that the horizontal component H of the earth magnetism is applied at an angle $\theta$ to the output winding 1B, and the horizontal component h of the distortion of the earth magnetism is applied at an angle $\phi$. The outputs x and y are given as $x = K_1(H\sin\theta + h\sin\phi) + K_3$
$Y = K_2(H\cos\theta + h\cos\phi) + K_4$ where $Khd 1$ and $K_2$ are the amplification factors carrying the distortion of the geomagnetic field sensor 1, and $K_3$ and $K_4$ are distortions by zero-point displacement of the geomagnetic field sensor 1. In the case where the vehicle, namely, $\theta$ is rotated by 360 degrees, the vectorial locus of the outputs x and y (points 15a and 15b) of the geomagnetic field sensor 1 assumes an ellipse with the center displaced from origin by $K_1 h\sin\phi + K_3$ along the X axis and $K_2 h\cos\phi + K_4$ along the Y axis at the eccentricity of $K_2/K_1$ as shown in FIG. 11.

Figure 12A:
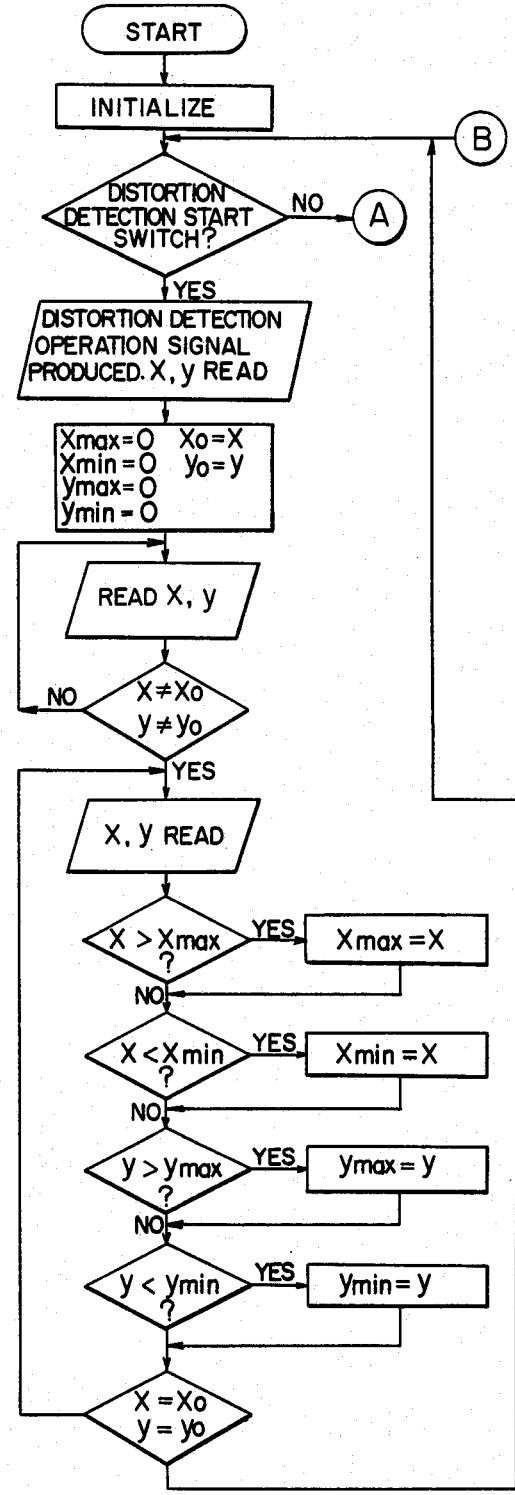
FIGS. 12A and 12B are flowcharts showing the computing processes of the computing section according to the third embodiment of the invention.
Figure 12B:
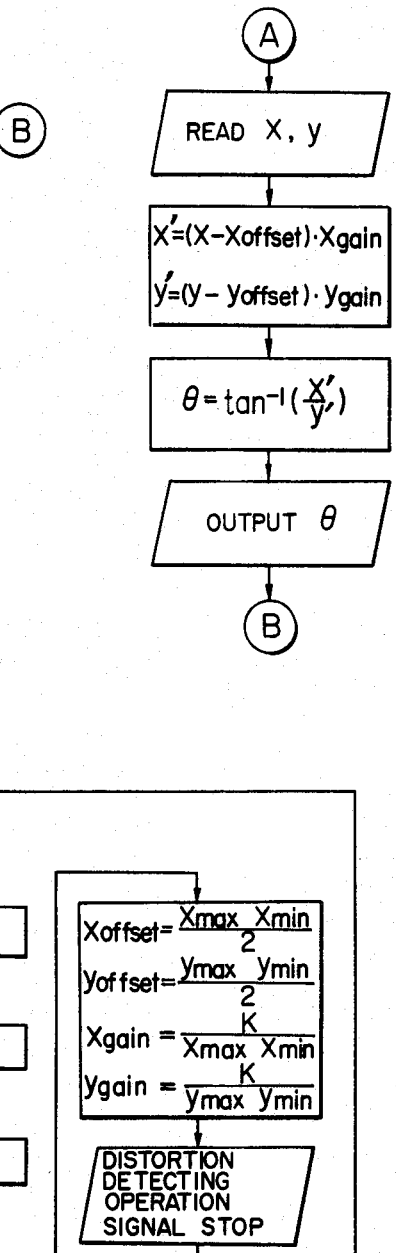

In the third embodiment, as in the embodiment of FIG. 1, the computing section 2 executes two types of computations shown in FIGS. 12A and 12B by use of a well-known microcomputer system at the computing section 2. First, in the computing process shown in FIG. 12A, the distortion amount is detected in response to the turning on of the distortion amount detection start switch 3.

A distortion amount detecting operation signal D is produced, so that a display unit not shown (such as of LED) indicates that the distortion amount is being detected, and the initial output values xo and yo of the geomagnetic field sensor 1 are read and stored. Then the outputs x and y of the geomagnetic field sensor 1 are read continuously to search for the maximum value Xmax; Ymax, and the minimum value Xmin, Ymin (the maximum distortions respectively according to the distortion characteristics). The values x and y thus read are compared with the stored initial values xo and yo, and when they coincide with each other after failure of coincidence, the four distortion amounts including the origin displacements of $$X\text{offset} = \frac{Xmax + Xmin}{2} ; Y\text{offset} = \frac{Ymax + Ymin}{2}$$

and amplification factor correction amounts $$X\text{gain} = \frac{K}{Xmax - Xmin} \text{ and } Y\text{gain} = \frac{K}{Ymax - Ymin}$$

from the maximum values Xmax, Ymax, and the minimum values Xmin, Ymin are determined and stored, where K is a constant, The distortion amount detecting operation signal D is suspended, and the indication of the display unit is cancelled, thus indicating the end of the distortion amount detecting process. In other words, when the distortion amount detection start switch 3 is turned on thereby to start the distortion amount detection process and the vehicle is rotated, the distortion amount Xoffset, Yoffset, Xgain and Ygain for correcting the origin-displaced ellipse shown in FIG. 11 to a circle with the origin at the center thereof (See FIG. 13) are obtained, and upon rotation of the vehicle by 360 degrees, the distortion amount detecting process is automatically completed.

Figure 13:
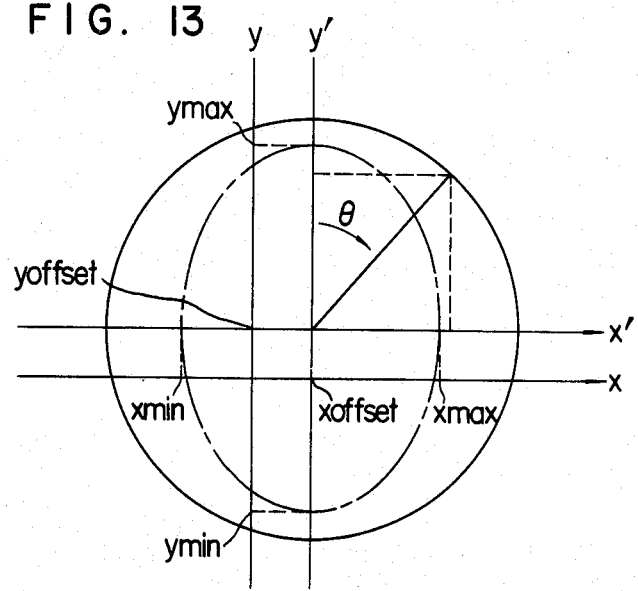
FIG. 13 is a diagram for explaining the computing processes of the computing section.

The computing process shown in FIG. 12B is such that when the distortion amount detection process of FIG. 12A is not being conducted, the outputs x and y of the sensor 1 are read, and in order to correct the ellipse to a circle with the origin at the center shown in FIG. 13 from the outputs x and y and the distortion amount, the computations $x'=(x-X\text{offset}) X\text{gain}$, and $y'=(y-Y\text{offset}) Y\text{gain}$ are made, followed by another computation $\theta=\tan^{-1}(x'/y')$ thereby to produce the direction signal $\theta$ corresponding to the running direction of the vehicle.

The direction directing system including this computing section 2 is actuated by a power supply turned on by a power switch exclusive to the system (which may alternatively be a power supply adapted to be turned on by the ignition switch of the vehicle). The distortion amount is stored (in non-volatile manner) regardless of the turning on or off of the power switch.

Of the distortion amount, the amplification factor correction amount may be determined by the computation of the $$\text{gain} = \frac{Ymax - Ymin}{Xmax - Xmin}$$

so as to make the computations of $x'=(x-X\text{offset})\cdot\text{gain}$ and $y'=(y-y\text{offset})\cdot\text{gain}$.

Further, the distortion amount detection start switch 3 used as timing generator means may be replaced with equal effect by a voice recognizing means for recognizing the voice indicative of a start of distortion amount detection.

We claim:
1. A direction detecting system including:
   direction detecting means mounted on a moving body for detecting a direction of two components of earth magnetism in order to produce two detection signals corresponding to said two components; and computing means for computing a direction of the moving body in response to the detection signals from said direction detecting means to produce a direction signal, said computing means comprising:

(a) first means responsive to the detection signals from said direction detecting means in accordance with a rotation of said moving body, for computing a distortion amount indicative of an offset value by which the vectorial locus of a circle which said detection signals define is displaced from a true circle centering at an origin, and for storing said distortion amount; and (b) second means for correcting the detection signals from said direction detecting means in accordance with said distortion amount stored by said first means to produce a corrected direction signal.

2. A system according to claim 1 further comprising a distortion amount detection switch for controlling the computing and storing operations of said first means.

3. A system according to claim 2, wherein said distortion amount is computed from a ratio of maximum values of said respective detection signals.

4. A system according to claim 2, wherein said distortion amount indicates an offset value by which a center of the vectorial locus of said circle is displaced from the origin.

5. A system according to claim 4, wherein said first means for computing and storing includes means for computing a maximum value and a minimum value of each of said detection signals, and means for dividing a sum of the maximum value and the minimum value of said respective detection signals by 2, a value obtained by said means for dividing being provided to indicate said distortion amount.

6. A system according to claim 5, wherein said second means for correcting includes means for producing said corrected direction signal by subtracting said offset value from an output value of said direction detecting means.

7. A system according to claim 4, wherein said first means for computing and storing includes means for computing a first offset value by dividing a sum of a first maximum value and a first minimum value obtained from one of said detecting signals by a first predetermined constant and a second offset value by dividing a sum of a second maximum value and a second minimum value obtained from the other of said detection signals by said first predetermined constant, means for computing a first gain by dividing a second predetermined constant by a difference value between said first maximum value and said first minimum value and a second gain by dividing a second predetermined constant by a difference value between said second maximum value and said second minimum value, and means for storing said first and second offset values and said first and second gains, and said second means for correcting includes first subtraction means for subtracting said first offset value from a first output value produced from said direction detecting means when said distortion amount detection switch is turned off, first mulitplication means for multiplying a first subtraction value, obtained by said first subtraction means, by said first gain thereby to produce a first correction value, and second subtraction means for subtracting said second offset value from a second output value, obtained from said direction detecting means, second multiplication means for multiplying a second subtraction value, obtained by said second subtraction means, by said second gain thereby to produce a second correction value.

8. A system according to claim 7, further comprising means for discriminating whether the corrected direction signal produced by said second means for correcting is out of a preset range or within said preset range, and means for informing of an abnormal state of the earth magnetism when said means for discriminating decides that said corrected direction signal is out of said preset range.

9. A system according to claim 8, further comprising means for deciding said preset range by mulitplying said first correction value by a first predetermined percentage value thereby to produce a maximum decision level, and by multiplying said second correction value by a second predetermined percentage value thereby to produce a minimum decision level.

10. A system according to claim 9, further comprising means for detecting a speed of said moving body, and wherein said first means for computing and storing includes means for producing an abnormality alarm signal when said means for discriminating decides that an output value of said direction detecting means is displaced from the maximum decision level of said preset range and from the minimum decision level of said preset range when said means for detecting detects that the speed of said moving body is higher than a predetermined level.

11. A direction detecting system including direction detecting means mounted on a moving body for detecting a direction of earth magnetism by detecting two components thereof perpendicular to each other so as to produce a detection signal and computing means for computing a direction of the moving body to generate a direction signal in response to the detection signal associated with said two components and produced by said direction detecting means, said system comprising:

means for generating a timing signal;

means for storing the detection signal from said direction detecting means when said means for generating generates said timing signal;

means for discriminating whether a detection signal from said direction detecting means is identical with the detection signal stored by said means for storing;

means, sequentially responsive to the detection signal from said direction detecting means, for computing a maximum value and a minimum value of said detection signal from the time when said means for generating generates the timing signal until the time when said means for discriminating decides that the detection signal of said direction detecting means is identical with that stored by said means for storing;

means for dividing a sum of the maximum value and the minimum value of the detection signal by 2 to provide an offset value when said means for discriminating decides that the detection signal of said direction detected means is identical with that stored by said means for storing; and means for correcting the detection signal from said direction detecting means in accordance with the offset value of the detection signal provided by said means for dividing.

* * * * *